US010102198B2

United States Patent
Astigarraga et al.

(10) Patent No.: US 10,102,198 B2
(45) Date of Patent: Oct. 16, 2018

(54) AUTOMATIC GENERATION OF ACTION ITEMS FROM A MEETING TRANSCRIPT

(71) Applicant: INTERNATIONAL BUSINESS MACHINES CORPORATION, Armonk, NY (US)

(72) Inventors: Tara Astigarraga, Fairport, NY (US); Ossama S. Emam, Mohandessen (EG); Al Hamid, Columbus, OH (US); Sara Noeman, Giza (EG); Kimberly G. Starks, Nashville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 100 days.

(21) Appl. No.: 14/962,584

(22) Filed: Dec. 8, 2015

(65) Prior Publication Data

US 2017/0161258 A1 Jun. 8, 2017

(51) Int. Cl.
*G06F 17/27* (2006.01)
*G06F 17/24* (2006.01)
(Continued)

(52) U.S. Cl.
CPC .......... *G06F 17/2775* (2013.01); *G06F 17/24* (2013.01); *G06F 17/278* (2013.01); *G06F 17/30864* (2013.01); *G06Q 10/10* (2013.01)

(58) Field of Classification Search
CPC ......... G06F 17/30716; G06F 17/30722; G06F 17/30746; G06F 17/278; G06F 17/2818;
(Continued)

(56) References Cited

U.S. PATENT DOCUMENTS 6,754,631 B1 * 6/2004 Din ........................ G10L 17/00
704/270
7,027,984 B2 * 4/2006 Lemon ................ G06F 17/2247
379/88.02
(Continued)

FOREIGN PATENT DOCUMENTS

JP 2015156099 A 8/2015

OTHER PUBLICATIONS

Patrick Ehlen, Matthew Purver and John Niekrasz, "A Meeting Browser that Learns", American Association for Artificial Intelligence, 2007, (pp. 1-8).
(Continued)

*Primary Examiner* — Satwant Singh
(74) *Attorney, Agent, or Firm* — Cantor Colburn LLP; Kurt Goudy (57) ABSTRACT

Examples of techniques for generating a plurality of action items from a meeting transcript of a meeting are disclosed. In one example implementation according to aspects of the present disclosure, a computer-implemented method comprises chunking the meeting transcript into a plurality of chunks using a meeting topic model. The computer-implemented method also comprises performing, by a processor, information extraction on the plurality of chunks to extract action item information from the plurality of chunks. The computer-implemented method further comprises generating the plurality of action items based on the extracted action item information.

19 Claims, 5 Drawing Sheets

(51) Int. Cl.
*G06F 17/30* (2006.01)
*G06Q 10/10* (2012.01)

(58) Field of Classification Search
CPC ............... G06F 17/289; G06F 17/3005; G06F 17/3061; G06F 17/30719; G06F 17/30864; G06F 17/2247; G06F 17/30011; G06F 17/2775
See application file for complete search history.

(56) References Cited

U.S. PATENT DOCUMENTS

| | | | |
|---|---|---|---|
| 7,058,660 B2* | 6/2006 | Scott | G06Q 10/04 |
| 8,214,242 B2* | 7/2012 | Agapi | G06Q 10/1095 |
| | | | 705/7.19 |
| 2006/0053125 A1* | 3/2006 | Scott | G06Q 10/04 |
| 2007/0250466 A1* | 10/2007 | Imrapur | G06F 17/30719 |
| 2008/0066072 A1* | 3/2008 | Yurekli | G06Q 10/06 |
| | | | 718/104 |
| 2010/0306018 A1* | 12/2010 | Burtner | G06Q 10/10 |
| | | | 705/7.19 |
| 2011/0107236 A1* | 5/2011 | Sambhar | H04L 12/1822 |
| | | | 715/753 |
| 2011/0225013 A1* | 9/2011 | Chavez | G06Q 10/10 |
| | | | 705/7.18 |
| 2013/0325972 A1* | 12/2013 | Boston | G06K 9/00751 |
| | | | 709/206 |
| 2014/0244252 A1* | 8/2014 | Dines | G10L 15/183 |
| | | | 704/235 |
| 2015/0294245 A1* | 10/2015 | Nagar | G06Q 10/063 |
| | | | 705/7.11 |
| 2016/0294964 A1* | 10/2016 | Brune | G06N 99/005 |
| 2016/0380950 A1* | 12/2016 | Foley | H04L 51/32 |
| | | | 709/205 |
| 2017/0132518 A1* | 5/2017 | Kitada | G06N 5/022 |

OTHER PUBLICATIONS

Satanjeev Banerjee et al., "SmartNotes: Implicit Labeling of Meeting Data through User Note—Taking and Browsing", Proceedings of the Conference of the North American Association of Computational Linguistics—Human Languages Technology, 2006, (pp. 1-5).

* cited by examiner

AUTOMATIC GENERATION OF ACTION ITEMS FROM A MEETING TRANSCRIPT

BACKGROUND

The present disclosure relates to action item generation techniques, and more particularly, relates to techniques for the automatic generation of action items from a meeting transcript of a meeting.

During a meeting, meeting participants may discuss various meeting topics relating to a particular subject or project, for example. As a result of these discussions, action items may be created. An action item represents an activity of some kind that needs to be completed such as performing a particular task, following up with a colleague to obtain particular information, providing a report as to the status of a particular event, and many others. Multiple action items may be created during a meeting, and these action items may be interlinked in that they may relate to the same activities, the same people, the same deadline, etc. and/or be dependent upon one another.

Present techniques for creating action items may rely on manual creation of action items that result from the meeting. The manual creation of action items decreases efficiency of the creation of the action items because it takes time to manually create the action items after the meeting. Moreover, manual creation of action items may result in inaccuracies in the action items because an action item may be assigned to the wrong person, may contain an incorrect deadline, etc., as a result of the manual creation of the action item.

SUMMARY

In accordance with aspects of the present disclosure, a computer-implemented method for automatically generating a plurality of action items from a meeting transcript of a meeting is provided. The computer-implemented method comprises chunking the meeting transcript into a plurality of chunks using a meeting topic model. The computer-implemented method also comprises performing, by a processor, information extraction on the plurality of chunks to extract action item information from the plurality of chunks. The computer-implemented method further comprises generating the plurality of action items based on the extracted action item information.

In accordance with additional aspects of the present disclosure, a system for generating a plurality of action items from a meeting transcript of a meeting is provided, and the system comprises a processor in communication with one or more types of memory. The processor is configured to chunk the meeting transcript into a plurality of chunks using a meeting topic model. The processor is also configured to perform information extraction on the plurality of chunks to extract action item information from the plurality of chunks. The processor is further configured to generate the plurality of action items based on the extracted action item information.

In accordance with yet additional aspects of the present disclosure, a computer program product for generating a plurality of action items from a meeting transcript of a meeting is provided, and the computer program product comprises a non-transitory storage medium readable by a processing circuit and storing instructions for execution by the processing circuit for performing a method. The method comprises chunking the meeting transcript into a plurality of chunks using a meeting topic model. The method also comprises performing information extraction on the plurality of chunks to extract action item information from the plurality of chunks. The method further comprises generating the plurality of action items based on the extracted action item information.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Figure 4:
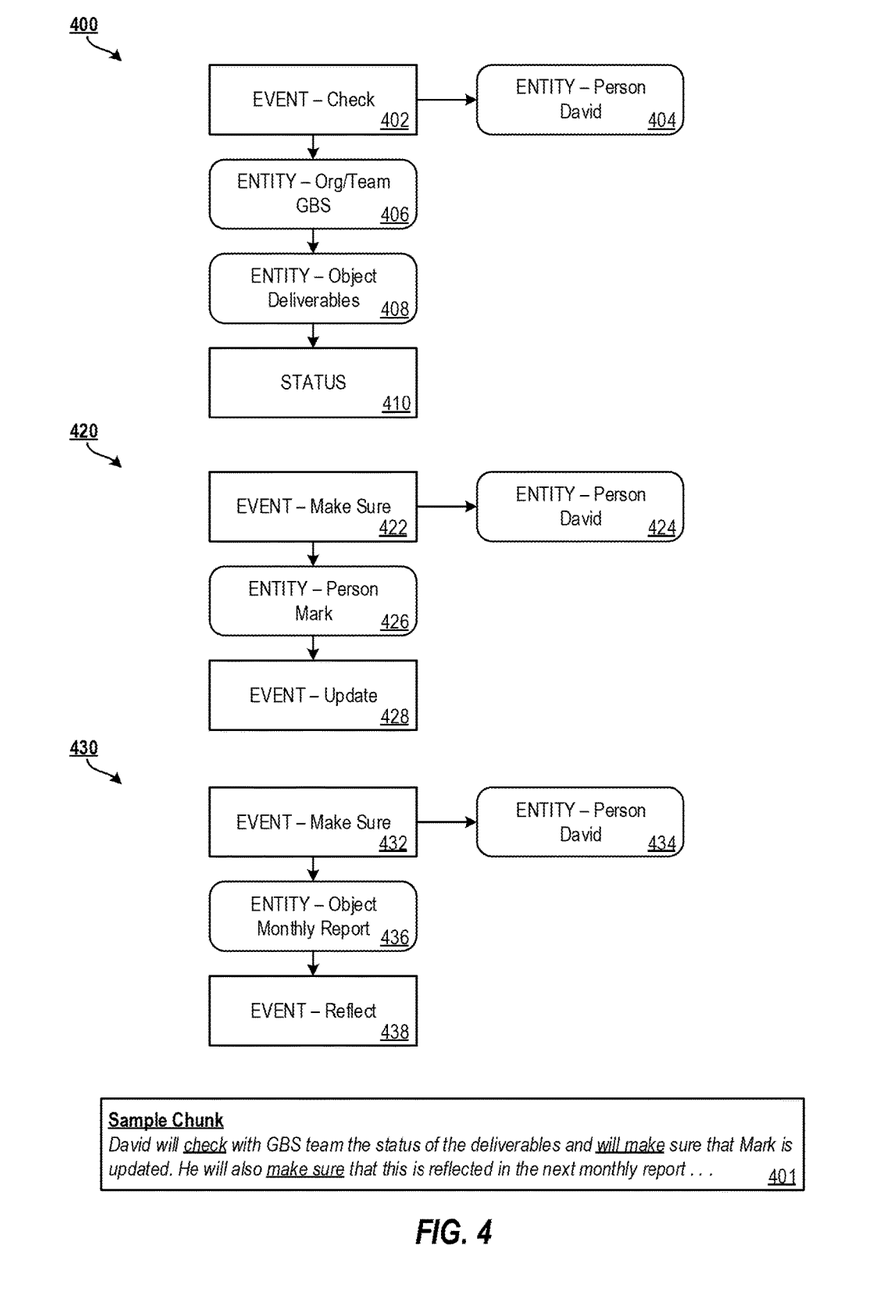
FIG. 4 illustrates action item graphs according to examples of the present disclosure.
Figure 5:
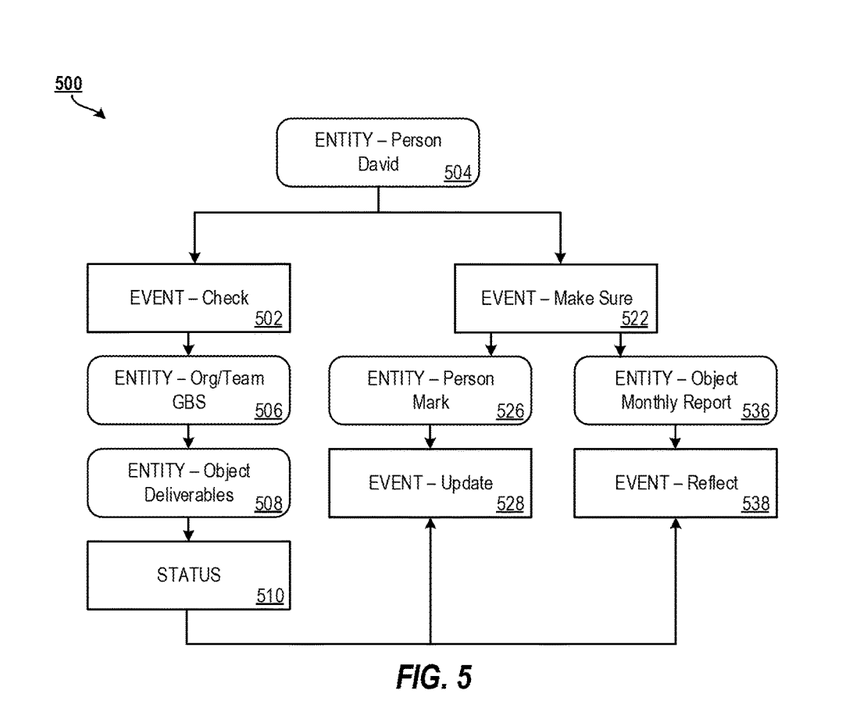
FIG. 5 illustrates a directed graph of action items according to examples of the present disclosure.
Figure 6:
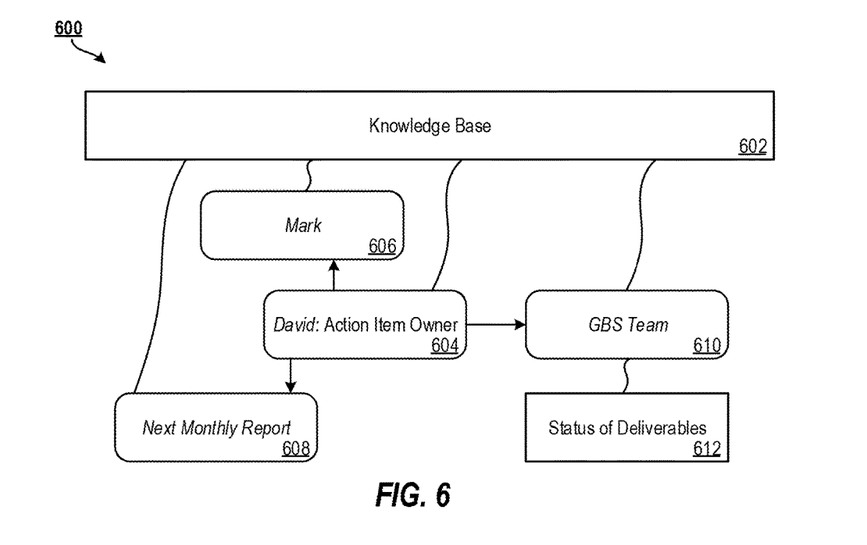
FIG. 6 illustrates a directed graph of action items according to examples of the present disclosure.

Various implementations of techniques for automatic generation of action items from meeting transcripts are described below by referring to several examples thereof. The techniques described herein structure action items and provide for capturing different types of action items and linking action items across meeting topics discussed in a single meeting and/or across meeting topics discussed during different meetings. In certain aspects of the present disclosure, a format for an action item is to record an action item number, the date when the action item is identified or created, the name of the person or entity to whom the action item is assigned, a title description of the action item, a detailed description of the action item, a desired outcome (e.g., a document, a report, an email, etc.) for the action item, any deliverables associated with the action item, and a priority for the action item. Graphic representations, as illustrated in FIGS. 4-6, enable action items to be viewed by a meeting owner/organizer to ensure that the automatically generated action items (and any related dependencies) are appropriate.

In some examples, the present techniques apply the automatic generation of action items to textual meeting transcripts, such as meeting notes or minutes, but the present techniques may also apply to audio and/or video recordings of meetings. For example, the present techniques may be applied on phone calls and/or teleconference meetings since some phone systems can apply call recording, speech recognition, and other information extraction techniques as described herein.

In some implementations, the present techniques increase efficiency of the creation of action items by automatically creating the action items from meeting transcripts. In addition, the generation and application of meeting topic models advantageously enable a processing system to more quickly and efficiently chunk the meeting transcripts. Moreover, using the meeting transcripts increases the accuracy of the action items. These and other advantages will be apparent from the description that follows.

Figure 1:
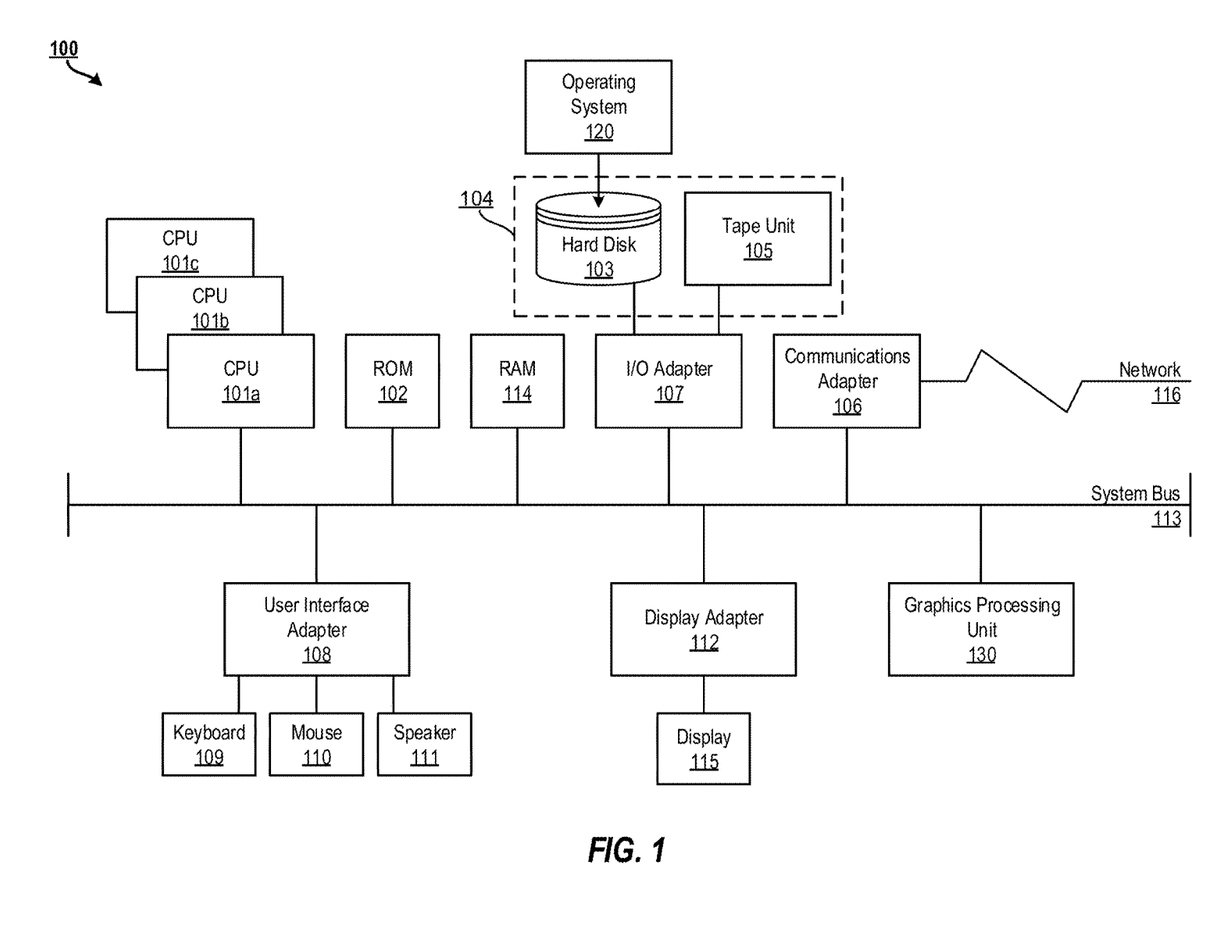
FIG. 1 illustrates a block diagram of a processing system for implementing the techniques described herein according to examples of the present disclosure.

FIG. 1 illustrates a block diagram of a processing system 100 for implementing the techniques described herein according to aspects of the present disclosure. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM)) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
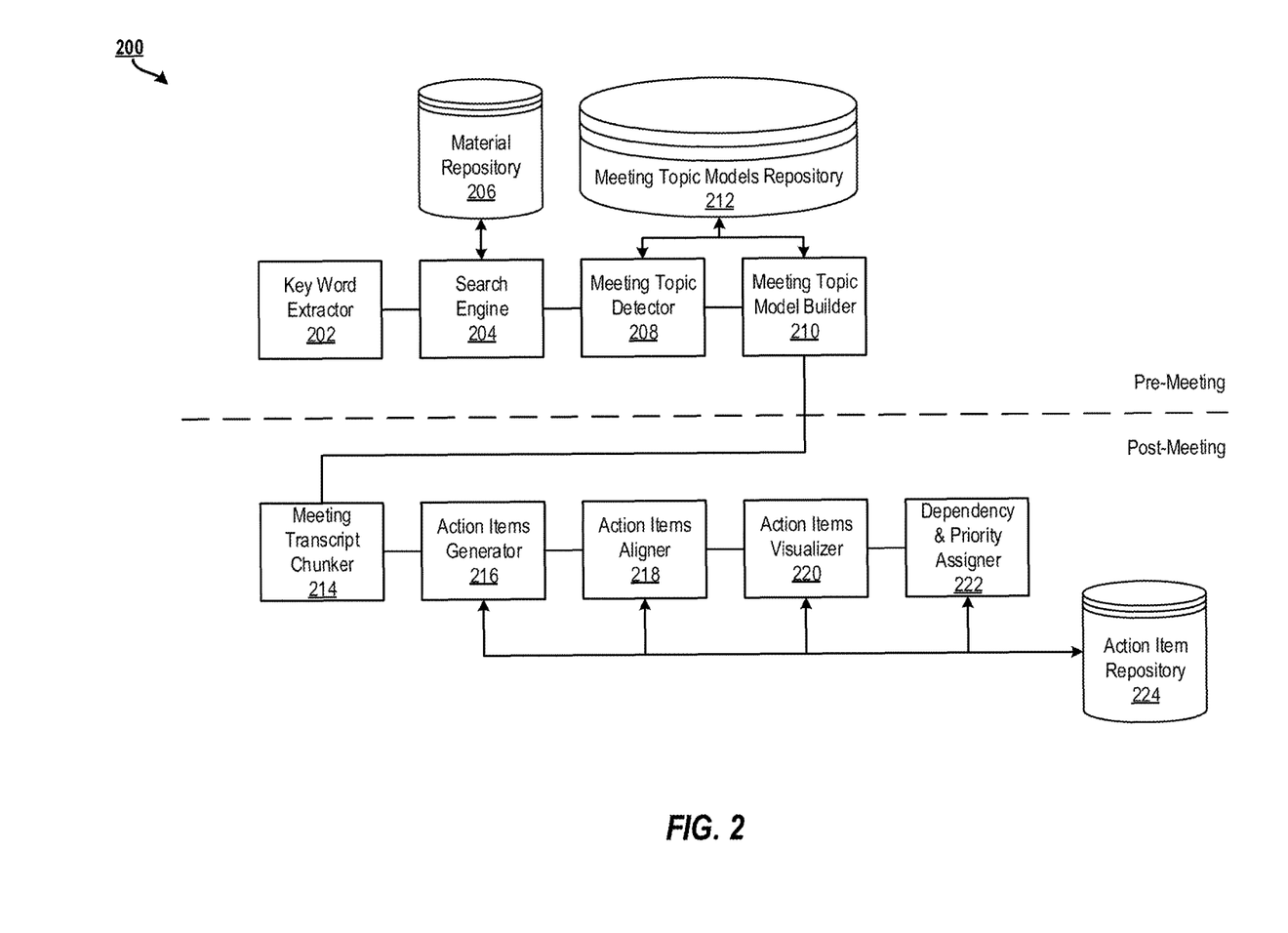
FIG. 2 illustrates a block diagram of a processing system for automatically generating a plurality of action items from a meeting transcript according to examples of the present disclosure.

FIG. 2 illustrates a block diagram of a processing system 200 for automatically generating a plurality of action items from a meeting transcript according to aspects of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processors 101 implement the engines described herein. Other engines may also be utilized to include other features and functionality described in other examples herein.

In the example of FIG. 2, the processing system 200 comprises the following engines: a key word extractor 202, a search engine 204, a meeting topic detector 208, a meeting topic model builder 210, a meeting transcript chunker 214, an action items generator 216, an action items aligner 218, an action items visualizer 220, and a dependency and priority assigner 222. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Prior to a meeting beginning, the key word extractor 202 receives meeting information materials, such as a meeting agenda, a meeting invitation (which may be an e-mail for example), presentations, or any other suitable materials that are made available prior to the meeting. The key word extractor 202 then performs key word extraction on the meeting information materials to extract key words from the materials. These key words are then used by the search engine 204 to search a material repository 206 to retrieve relevant materials to the meeting topics. For example, the material repository 206 may contain documents relating to the meeting, previous meeting transcripts, enterprise data, white papers, e-mails, and the like.

The relevant materials are tagged by the meeting topic detector 208, which uses the text of the meeting information materials and relevant materials to determine whether the meeting relates to any existing meeting topic models stored in meeting topic models repository 212. If the meeting relates to an existing meeting topic model, the existing meeting topic model is applied. However, if no existing topic model is appropriate, the meeting topic model builder 210 builds a new model based on the meeting information materials and relevant materials. In aspects of the present disclosure, each meeting topic, the meeting information materials and relevant materials are used to build a meeting topic model, which is stored in the meeting topic models repository 212 for future use. It may be advantageous to retain prior meeting topic models to expedite the chunking of future meeting transcripts. It may also be advantageous to retain prior meeting topic models to standardize chunking for similar meeting types.

After the meeting occurs, a meeting transcript, such as meeting notes or minutes, are segmented into "chunks" by the meeting transcript chunker 214. The meeting transcript chunker 214 utilizes the meeting topic model identified by the meeting topic detector 208 to identify the chunks of the meeting transcript that relate to different meeting topics. The action items generator 216 then generates action items for each chunk. The action items are generated in a form of action item graphs, as illustrated in FIG. 4 as action items 400, 420, and 430. The action items may have a variety of attributes, as follows, which represent action item information. These attributes are identified by the action items generator 216 by performing information extraction on the plurality of chunks to extract the action item information. Examples of action item information (or attributes) for an action item may include one or more of the following: owner (i.e., who is responsible for actively working on the action item); description (i.e., explanation of activity to be performed); issue or risk (i.e., associated with a project issue or risk); urgency/priority (i.e., the impact of the project's critical path); comments (i.e., description of what is being done to solve the action item); critical date (i.e., date action item was created/opened); planned completion date or deadline (i.e., when the action item is to be resolved); status (e.g., open, in progress, resolved, canceled, etc.); and completion date (i.e., the date when the action item is completed).

The action items aligner 218 then aligns action items based on common entities, for example, or based on other parameters as appropriate. The action items visualizer 220 generates a visualization of the generated action items that enable a user to view generated action items per entity, such as illustrate in FIG. 5. For example, for a person "David," the action items that David owns are illustrated and are linked to the other relevant entities.

The dependency and priority assigner 222 enables the user to review and/or assign dependencies and priorities to action items. For example, an action item may be dependent upon another action item. In such an example, if David is to write a report using information received from Mark, a "write report" event may be dependent upon a "receive information" event. Priorities may also be assigned to action items as discussed herein The action item repository 224 may store the action items and any associated attributes. The action item repository 224, as well as material repository 206, and meeting topic models repository 212 may represent any suitable data store, data base, or data repository for storing data and information.

Figure 3:
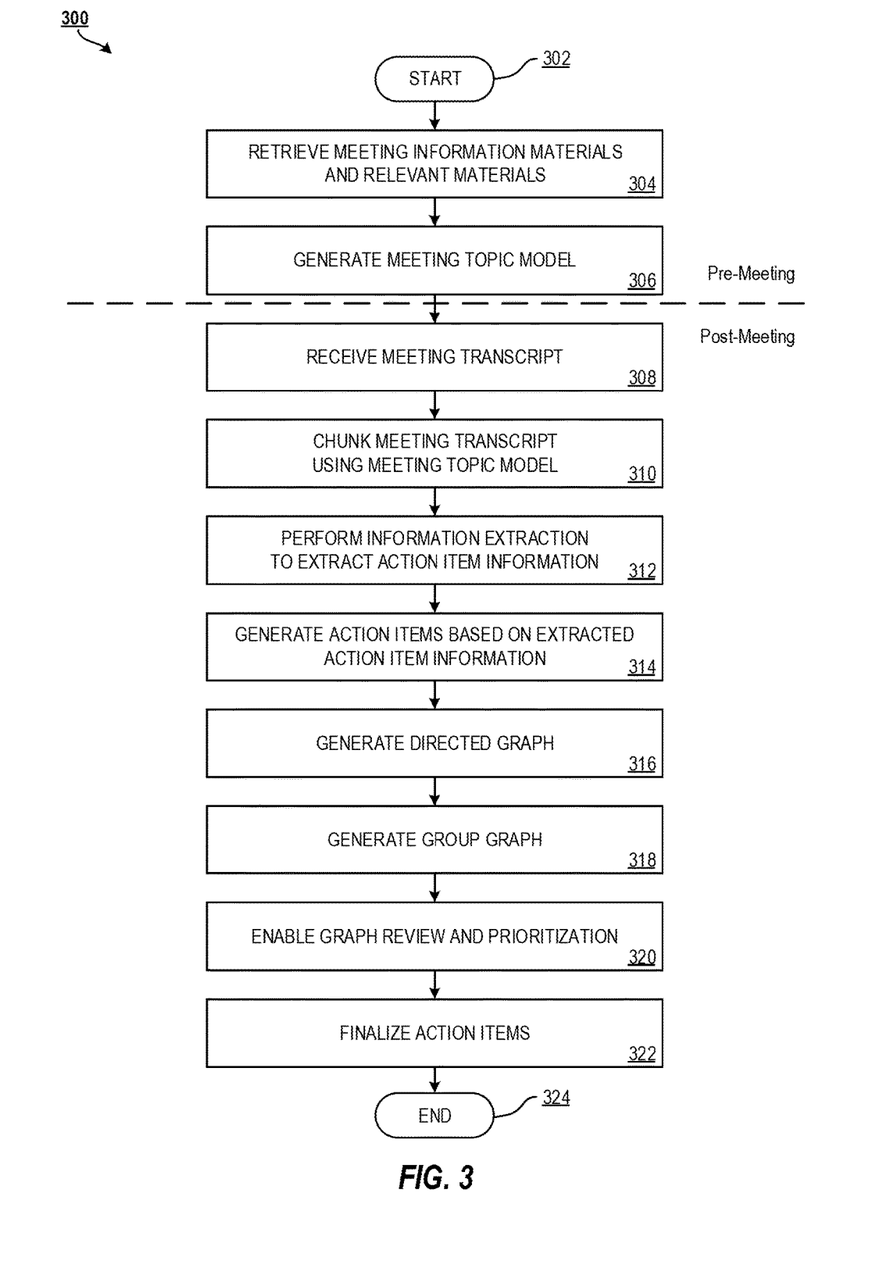
FIG. 3 illustrates a flow diagram of a method for automatically generating a plurality of action items from a meeting transcript according to examples of the present disclosure.

FIG. 3 illustrates a flow diagram of a method 300 for automatically generating a plurality of action items from a meeting transcript according to examples of the present disclosure. The method 300 begins at block 302 and continues to block 304.

At block 304, the method 300 includes retrieving meeting information materials, such as a meeting agenda, a meeting invitation (which may be an e-mail for example), presentations, or any other suitable materials that are made available prior to the meeting, and relevant materials such as documents relating to the meeting, previous meeting transcripts, enterprise data, white papers, e-mails, and the like. In some aspects of the present disclosure, the retrieving the meeting information materials and relevant materials at block 304 may also include performing key word searches to identify the relevant materials, such as in a material repository (e.g., material repository 206 of FIG. 2). At block 306, the method 300 includes generating a meeting topic model. In some examples, a new meeting topic model is generated based on the retrieved meeting information materials and relevant materials. In additional examples, an existing meeting topic model may be identified, such as from a meeting topic models repository (e.g., meeting topic model repository 212 of FIG. 2) based on the retrieved meeting information materials and relevant materials. Blocks 304 and 306 may be performed prior to the meeting while the remaining blocks illustrated in FIG. 3 may be performed following the meeting, although at least some aspects of block 304 and/or 306 may be performed during and/or after the meeting in aspects of the present disclosure.

At block 308, the method 300 includes receiving a meeting transcript, which may include meeting notes or minutes. In aspects of the present disclosure, the meeting transcript may also include an audio and/or video recording of the meeting. Continuing to block 310, the method 300 includes chunking the meeting transcript into a plurality of chunks using the meeting topic model determined or generated prior to the meeting. The generation and application of meeting topic models advantageously enable a processing system to chunk the meeting transcript more quickly and efficiently by recognizing meeting topics. For example, a meeting topic model is useful to identify particular meeting topics so that the chunking can be performed on related meeting topics and chunks can begin and end according to changes in meeting topics. In additional aspects of the present disclosure, the chunking may also be performed based on punctuation, headings and subheadings, and other indicators of changes in meeting topics.

At block 312, the method 300 includes performing information extraction on the plurality of chunks to extract action item information from the plurality of chunks. In particular, information extraction techniques parse the sentences of the chunks of the meeting transcript to extract information such as entities, relations, events, co-references, due dates, priorities, and dependencies. The extracted information is then used at block 314 to generate action items.

At block 316, the method 300 includes generating an action item graph of the individual action items. Examples of action item graphs are illustrated in FIG. 4 as action item graph 400, action item graph 420, and action item graph 430.

At block 318, the method 300 includes generating a directed graph representative of a plurality of action item graphs having a common entity. Examples of a directed graph are illustrated in FIGS. 5 and 6 as directed graphs 500 and 600 respectively. In examples, the directed graphs may be representative of action item graphs having other commonalities, such as common relations, common events, common co-references, common due dates, common priorities, common dependencies, and the like.

At block 320, the method 300 enables graph review and prioritization by presenting a user, such as a meeting organizer or meeting owner, with the action item graph(s) and/or directed graph(s). The user may edit the individual action items by altering the action item graph(s) and/or directed graph(s). The user may also assign a priority to the individual action items. The priority may be on a scale of 1 to 5, with 1 being the lowest priority and 5 being the highest priority, for example, or the priority scale may be low/medium/high in other examples. At block 320, the method 300 includes the user finalizing the action items. Once finalized, the action items may be distributed to the individual entities to which the action items are assigned. At block 324, the method 300 terminates.

Additional processes also may be included, and it should be understood that the processes depicted in FIG. 3 represent illustrations, and that other processes may be added or existing processes may be removed, modified, or rearranged without departing from the scope and spirit of the present disclosure.

FIG. 4 illustrates action item graphs 400, 420, and 430 according to examples of the present disclosure. The action item graphs 400, 420, and 430 are generated from a sample chunk 401 representative of one example of a chunk of data from the meeting transcript. In the present example, sample chunk 401 is as follows: "David will check with GBS team the status of the deliverables and will make sure that Mark is updated. He will also make sure that this is reflected in the next monthly report." The underlined portions of the sample chunk 401 are identified as events during information extraction. Additionally, the action item information extracted from the plurality of chunks may comprise an entity, a relation, an event, and a co-reference. An entity represents a person, organization, or group. A relation represents the relation between or among entities and/or between and among events. An event represents a particular activity or action to be performed. A co-reference represents a reference to another action item or entity.

The action item graph 400 relates to "David will check with the GBS team the status of the deliverables" from the sample chunk 401. In particular, for the action item graph 400, the event is identified as event—check 402 and is assigned to entity—person David 404. Additional attributes are identified as being the entity—org/team GBS 406, entity—object deliverables 408, and status 410.

The action item graph 420 relates to "David . . . will make sure that Mark is updated" from the sample chunk 401. In particular, for the action item graph 420, the event is identified as event—make sure 422 and is assigned to entity—person David 424. Additional attributes are identified as being the entity—person Mark 426 and event—update 428.

The action item graph 430 relates to "He will also make sure that this is reflected in the next monthly report" from the sample chunk 401. In particular, for the action item graph 430, the event is identified as event—make sure 432 and is assigned to entity—person David 434. Additional attributes are identified as being the entity—object monthly report 436 and event—reflect 438.

The action item graphs 400, 420, and 430 of FIG. 4 may be combined into a directed graph. In particular, FIG. 5 illustrates a directed graph 500 of action items according to examples of the present disclosure. The root node of the directed graph 500 represents the action owner, which in this case is entity—person David 504. For entity—person David 504, the event—check 502 and event—make sure 522 are assigned. The event—check 504 has the attributes entity—org/team GBS 506, entity—object deliverables 508, and status 510. The event—make sure 522 has the attributes entity—person Mark 526, event—update 528, entity—object monthly report 536, and event reflect 538.

The directed graph 500 of FIG. 5 may also be presented in another from as illustrated in FIG. 6 in which a knowledge base is used to extract additional information about the entities of the directed graph. In particular, FIG. 6 illustrates a directed graph 600 of action items according to examples of the present disclosure. The directed graph 600 uses knowledge base 602 to extract the additional information about the entities (e.g., David: action item owner 604, Mark 606, GBS team 610, next monthly report 608, and status of deliverables 612). In some examples, urgency/priority attributes may be detected and associated with the action items using the directed graph 600.

In aspects of the present disclosure, the action item graphs 400, 420, and/or 430 of FIG. 4, as well as the directed graph 500 of FIG. 5 and/or the directed graph 500 of FIG. 6 may be graphically presented to a user, such as a meeting organizer or meeting owner. The user may review the graphs and may modify and approve the graphs using a visualization tool and graph editing user interface. The graphs enable the user to quickly and easily review the automatically generated action items and their dependencies.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for automatically generating a plurality of action items from a meeting transcript of a meeting, the method comprising:
   chunking the meeting transcript into a plurality of chunks using a meeting topic model;
   performing, by a processor, information extraction on the plurality of chunks to extract action item information from the plurality of chunks;
   generating the plurality of action items based on the extracted action item information; and
   enabling a meeting organizer to assign a priority and a dependency to each of the plurality of action items.

2. The computer-implemented method of claim 1, further comprising:
   prior to the meeting, receiving relevant meeting materials; and
   prior to the meeting, generating the meeting topic model based on the relevant meeting materials.

3. The computer-implemented method of claim 1, further comprising:
   generating an action item graph representative of one of the plurality of action items.

4. The computer-implemented method of claim 3, further comprising:
   generating a directed graph representative of a plurality of action item graphs having a common entity.

5. The computer-implemented method of claim 3, wherein the action item graph depicts the dependency assigned by the meeting organizer.

6. The computer-implemented method of claim 1, wherein the action item information extracted from the plurality of chunks comprises at least an entity, a relation, an event, and a co-reference.

7. The computer-implemented method of claim 1, further comprising:
   enabling the meeting organizer to review an action item.

8. A system for generating a plurality of action items from a meeting transcript of a meeting, the system comprising:
   a processor in communication with one or more types of memory, the processor configured to
   chunk the meeting transcript into a plurality of chunks using a meeting topic model,
   perform information extraction on the plurality of chunks to extract action item information from the plurality of chunks,
   generate the plurality of action items based on the extracted action item information, and
   enable a meeting organizer to assign a priority to each of the plurality of action items.

9. The system of claim 8, wherein the processor is further configured to:
   prior to the meeting, receive relevant meeting materials; and
   prior to the meeting, generate the meeting topic model based on the relevant meeting materials.

10. The system of claim 8, wherein the processor is further configured to:
    generate an action item graph representative of one of the plurality of action items.

11. The system of claim 10, wherein the processor is further configured to:
    generate a directed graph representative of a plurality of action item graphs having a common entity.

12. The system of claim 8, wherein the action item information extracted from the plurality of chunks comprises at least an entity, a relation, an event, and a co-reference.

13. The system of claim 8, wherein the processor is further configured to:
   enable the meeting organizer to review an action item.

14. A computer program product for generating a plurality of action items from a meeting transcript of a meeting, the computer program product comprising:
   a non-transitory storage medium readable by a processing circuit and storing instructions for execution by the processing circuit for performing a method comprising
   chunking the meeting transcript into a plurality of chunks using a meeting topic model,
   performing information extraction on the plurality of chunks to extract action item information from the plurality of chunks,
   generating the plurality of action items based on the extracted action item information, and
   enabling a meeting organizer to assign a priority to each of the plurality of action items.

15. The computer program product of claim 14, wherein the method further comprises:
   prior to the meeting, receiving relevant meeting materials; and
   prior to the meeting, generate the meeting topic model based on the relevant meeting materials.

16. The computer program product of claim 14, wherein the method further comprises:
   generating an action item graph representative of one of the plurality of action items.

17. The computer program product of claim 16, wherein the method further comprises:
   generating a directed graph representative of a plurality of action item graphs having a common entity.

18. The computer program product of claim 14, wherein the action item information extracted from the plurality of chunks comprises at least an entity, a relation, an event, and a co-reference.

19. The computer program product of claim 14, wherein the method further comprises:
   enabling the meeting organizer to review an action item.

* * * * *